US007090273B2

(12) United States Patent
Stojkovic et al.

(10) Patent No.: US 7,090,273 B2
(45) Date of Patent: Aug. 15, 2006

(54) SEAL APPARATUS FOR AN IMPROVED FRONT-END TO BODY-SIDE JOINT OF A VEHICLE

(75) Inventors: Dragan Stojkovic, Southgate, MI (US); James W. Lowe, Temperance, MI (US); Bruce Anderson, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 50 days.

(21) Appl. No.: 10/905,592

(22) Filed: Jan. 12, 2005

(65) Prior Publication Data

US 2006/0152027 A1    Jul. 13, 2006

(51) Int. Cl.
*B62D 27/00* (2006.01)
(52) U.S. Cl. .................................... 296/29; 296/187.02
(58) Field of Classification Search .................. 296/29, 296/187.02, 1.06, 205
See application file for complete search history.

(56) References Cited

U.S. PATENT DOCUMENTS

| 2,107,382 | A |   | 2/1938  | Maddock |            |
|-----------|---|---|---------|---------|------------|
| 4,560,198 | A |   | 12/1985 | Katano et al. |      |
| 5,102,188 | A | * | 4/1992  | Yamane  | 296/187.02 |
| 5,458,393 | A |   | 10/1995 | Benedyk |            |
| 5,642,914 | A | * | 7/1997  | Takabatake | 296/187.02 |
| 5,806,919 | A |   | 9/1998  | Davies  |            |
| 5,941,123 | A | * | 8/1999  | Numakami | 74/18.1   |
| 5,979,902 | A |   | 11/1999 | Chang et al. |       |
| 6,114,004 | A | * | 9/2000  | Cydzik et al. | 428/81 |
| 6,332,642 | B1 |  | 12/2001 | Hanyu   |            |
| 6,358,584 | B1 |  | 3/2002  | Czaplicki |          |
| 6,416,119 | B1 |  | 7/2002  | Gericke et al. |     |
| 6,539,604 | B1 | * | 4/2003 | Patelczyk | 29/421.1 |
| 6,923,484 | B1 | * | 8/2005 | Braun et al. | 296/29 |
| 2001/0050497 | A1 |  | 12/2001 | Jackel et al. |    |
| 2003/0137162 | A1 |  | 7/2003 | Kropfeld |           |
| 2003/0184121 | A1 | * | 10/2003 | Czaplicki et al. | 296/187.02 |
| 2004/0239148 | A1 | * | 12/2004 | Ratet | 296/187.02 |
| 2006/0061137 | A1 | * | 3/2006 | Stojkovic et al. | 296/198 |

* cited by examiner

*Primary Examiner*—Kiran B. Patel
(74) *Attorney, Agent, or Firm*—Gigette M. Bejin; Artz & Artz, P.C.

(57) ABSTRACT

One embodiment of the present invention is a seal apparatus (16) for an improved front-end to body-side joint (10) of a vehicle. The seal apparatus (16) includes a ring portion (36), a gate portion (38), and an intermediate portion (40) extending between the ring portion (36) and the gate portion (38). The ring portion (36) is utilized for receiving an open-ended tubular front-end structure (12) of the improved front-end to body-side joint (10). Additionally, the ring portion (36) is utilized for sealing an interface between the front-end structure (12) and a body-side structure (14). Further, the gate portion (38) is sized for insertion into an interior cavity (42) of the front-end structure (12) and for blocking communication through the interior. Also, the ring portion (36) and/or the intermediate portion (40) have a self-locating construction for positioning the seal apparatus (16) in a predetermined location (50) on the front-end structure (12).

17 Claims, 4 Drawing Sheets

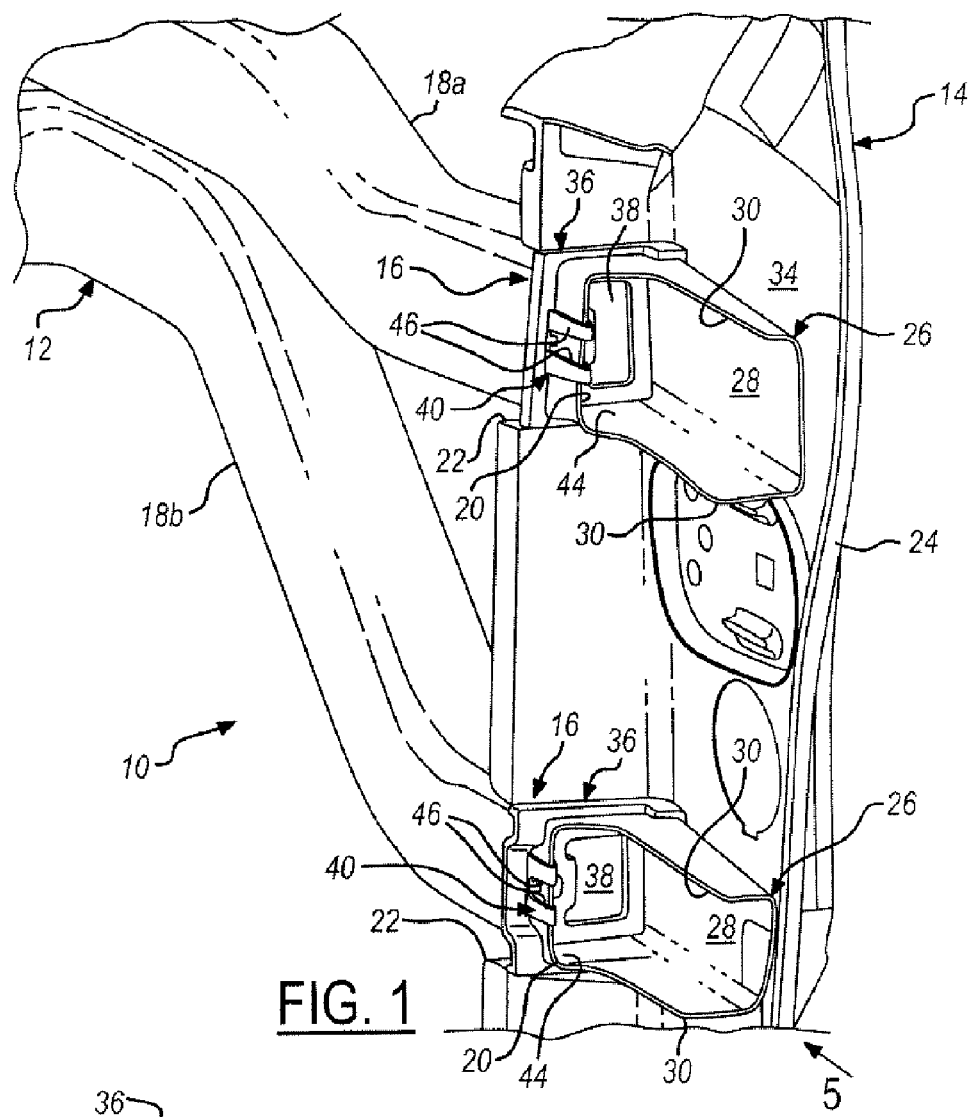
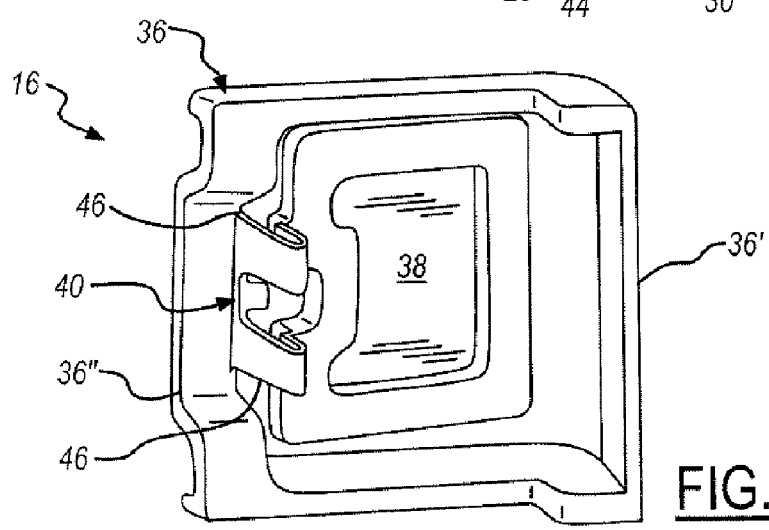

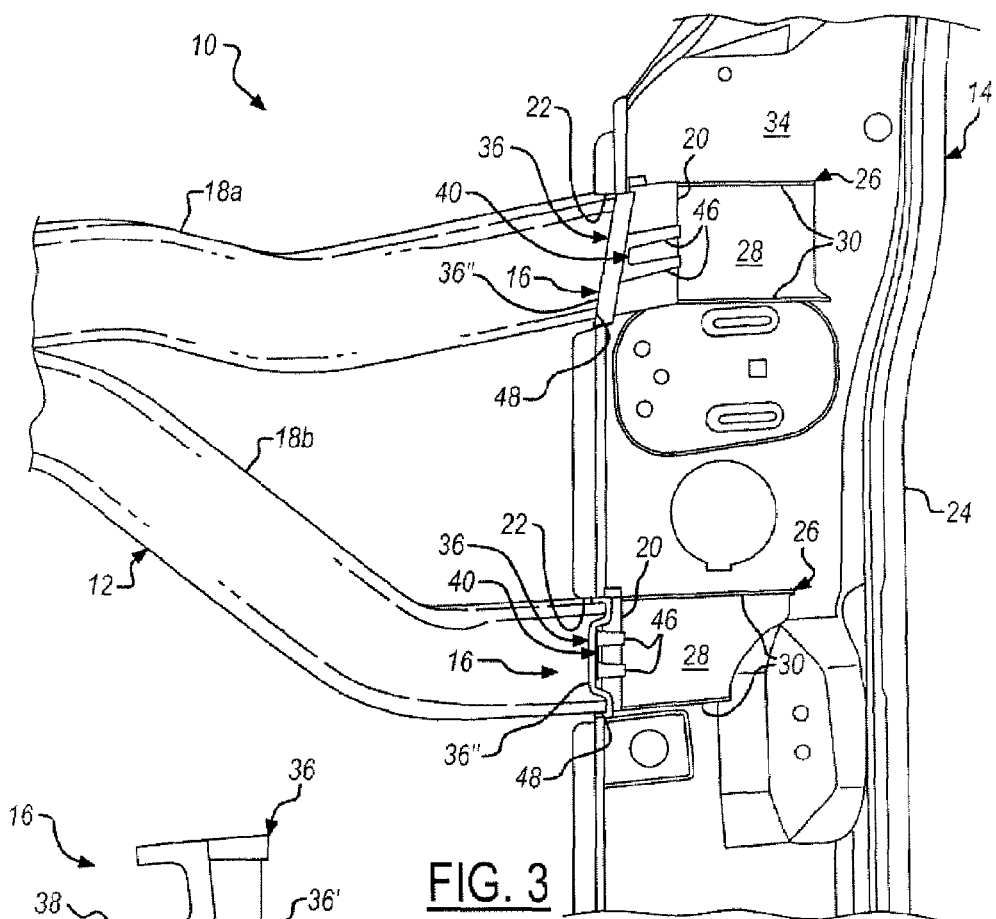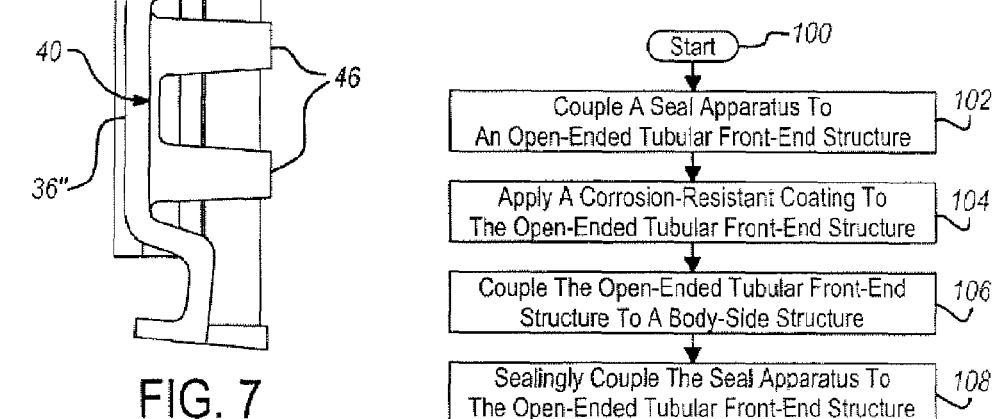

SEAL APPARATUS FOR AN IMPROVED FRONT-END TO BODY-SIDE JOINT OF A VEHICLE

TECHNICAL FIELD

The present invention relates generally to vehicle body construction, and more particularly to a seal apparatus for an improved front-end to body-side joint of a vehicle.

BACKGROUND OF THE INVENTION

Typical vehicle body construction includes a front end and a body, which are both mounted to a vehicle frame. The front end typically is coupled to the body for forming a front-end to body-side joint.

Specifically, the body typically includes an A-pillar section having an exterior side with a longitudinally-extending member, e.g. a stub shotgun, of the front end coupled thereto. In addition, the A-pillar section typically further includes an interior side with one or more reinforcement plates mounted thereon. These reinforcement plates typically are utilized for reinforcing the A-pillar section and supporting one or more door hinges that are disposed at or adjacent to the A-pillar section.

It would be desirable to provide a seal apparatus for an improved front-end to body-side joint that insulates the interior cab from noise typically produced external thereto, increases the rigidity of the vehicle body, decreases the number of the vehicle components, minimizes the manufacturing cycle time, and decreases the costs associated therewith.

SUMMARY OF THE INVENTION

One embodiment of the present invention is a seal apparatus for an improved front-end to body-side joint of a vehicle. The seal apparatus includes a ring portion, a gate portion, and an intermediate portion extending between the ring portion and the gate portion. The ring portion is utilized for receiving an open-ended tubular front-end structure of the improved joint. Additionally, the ring portion is utilized for sealing an interface between the front-end structure and a body-side structure. Further, the gate portion is sized for insertion into an interior cavity of the front-end structure and for blocking communication through the interior. Also, the ring portion and/or the intermediate portion have a self-locating construction for positioning the seal apparatus in a predetermined location on the front-end structure.

One advantage of the present invention is that a seal apparatus for an improved front-end to body-side joint is provided that minimizes the noise that can be transmitted to an interior cab of the vehicle from an engine compartment and/or the exterior of the vehicle.

Another advantage of the present invention is that an improved front-end to body-side joint is provided that includes substantially few components so as to further decrease the manufacturing cycle time and the costs associated therewith.

Yet another advantage of the present invention is that an improved front-end to body-side joint is provided that increases the reliability and the precision of manufacture.

Still another advantage of the present invention is that an improved front-end to body-side joint is provided that has a substantially rigid construction for strengthening the vehicle body construction.

Other advantages of the present invention will become apparent upon considering the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of the examples of the invention:

FIG. 1 is a rear perspective view of an improved front-end to body-side joint having a seal apparatus integrated therein, according to one advantageous embodiment of the claimed invention.

FIG. 3 is an interior plan view of the improved front-end to body-side joint shown in FIG. 1.

FIG. 6 is a perspective view of the seal apparatus shown in FIG. 1.

FIG. 7 is side view of the seal apparatus shown in FIG. 1.

FIG. 8 is a logic flow diagram of a method for manufacturing the improved front-end to body-side joint shown in FIG. 1.

DETAILED DESCRIPTION OF THE INVENTION

Figure 2:
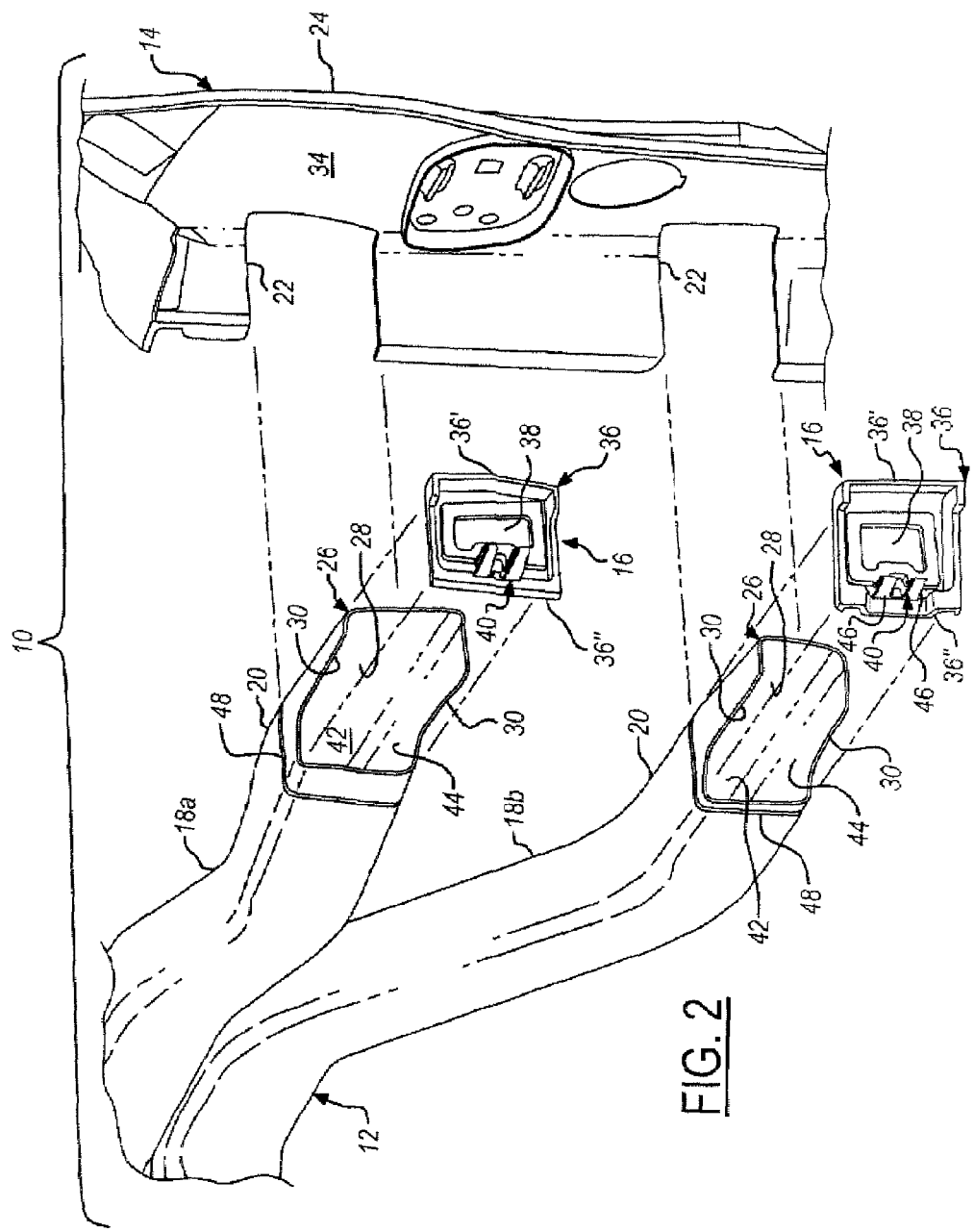
FIG. 2 is an exploded view of the improved front-end to body-side joint shown in FIG. 1.

In the following FIGURES, the same reference numerals are used to identify the same components in the various views.

The present invention is particularly suited for a front-end structure of a vehicle body construction. In this way, the embodiments described herein employ structural features where the context permits. However, various other embodiments are contemplated having different combinations of the described features, having features other than those described herein, or lacking one or more of those features. For example, it is understood that the invention can be utilized for a rear-end structure and/or an intermediate structure of the vehicle body construction. In this regard, it is contemplated that the invention can be carried out in a variety of other modes and utilized for other suitable applications as desired.

Referring to FIG. 1, there is shown a perspective view of an improved front-end to body-side joint 10 ("improved joint") for a vehicle, according to one advantageous embodiment of the claimed invention. This improved joint 10 includes an open-ended tubular front-end structure 12 ("front-end structure"), a body-side structure 14 coupled to the front-end structure 12, and a seal apparatus 16 coupled to the front-end structure 12.

As detailed below, the seal apparatus 16 is utilized for insulating an interior vehicle cab generally from an engine compartment and an exterior of the vehicle. In that way, the seal apparatus 16 is beneficial for insulating the interior cab from the noise typically produced by the engine, the road, and various other external noise sources.

As best shown in FIG. 2, the front-end structure 12 is comprised of a first hydroformed tube 18a and a second hydroformed tube 18b, which are coupled to each other via automatic laser welding, continuous fusion welding, bolt fasteners, rivet fasteners, various other suitable fastening processes, or any combination thereof. The hydroformed tubes 18a, 18b are advantageous for providing a construction with a substantially high strength-to-weight ratio. However, it is contemplated that the front-end structure 12 can instead be comprised of various other constructions as desired. Also, it will be appreciated that the front-end structure 12 can include more or less than two hydroformed tubes 18a, 18b as desired.

In this embodiment, the first hydroformed tube 18a and the second hydroformed tube 18b each have an open-ended portion 20 extending through respective notches 22 in a pillar member 24 of the body-side structure 14.

Figure 4:
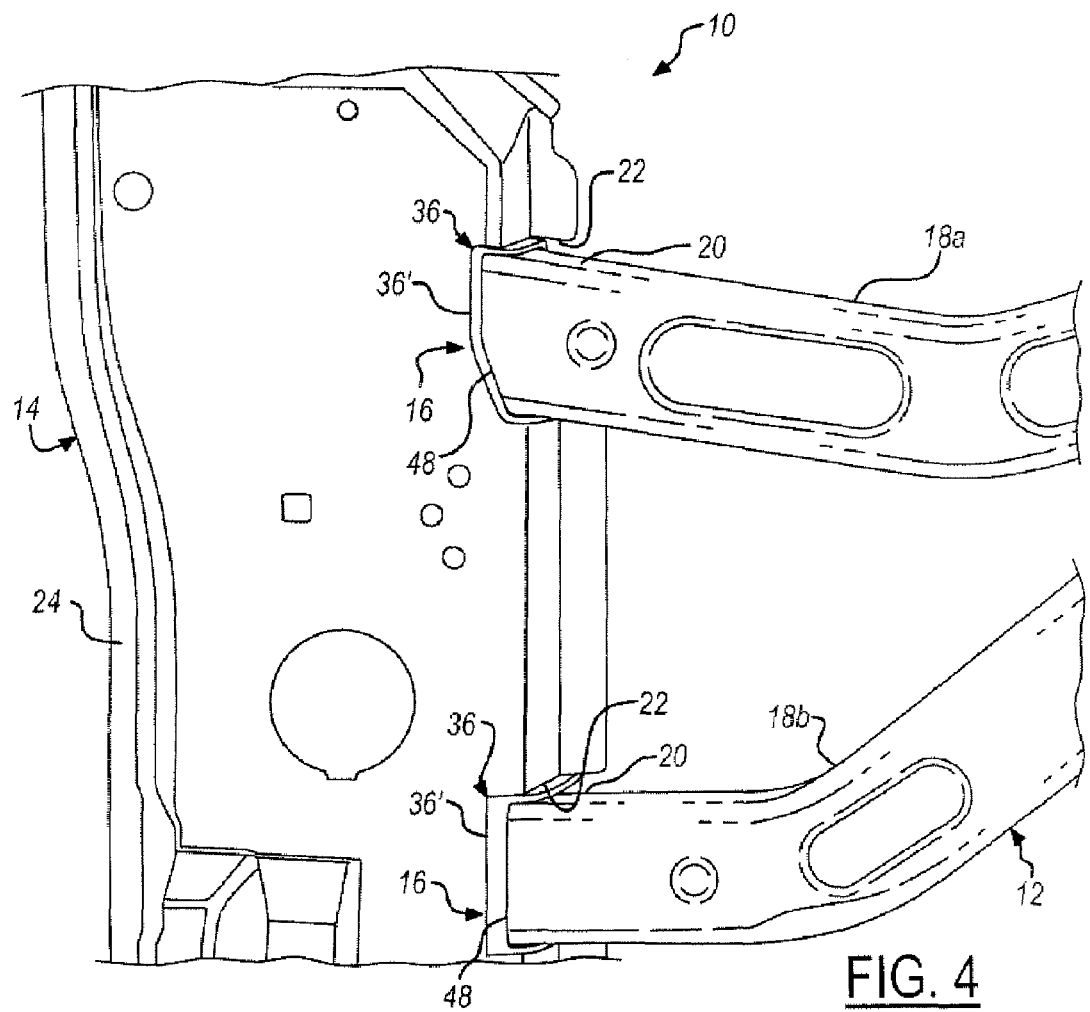
FIG. 4 is an exterior plan view of the improved front-end to body-side joint shown in FIG. 1.

Moreover, each open-ended portion 20 has a hinge-reinforcement portion 26 extending therefrom. These hinge-reinforcement portions 26 are integral parts of the hydroformed tubes 18a, 18b. One skilled in the art will appreciate that conventional hinge-reinforcement plates typically are separate pieces attached to the interior surface of a pillar member while the conventional front end structure is usually attached to the exterior surface of the pillar member. In this regard, as generally shown in FIGS. 3 and 4, the hydroformed tubes 18a, 18b minimize the number of separate components in the improved joint 10 and decrease the time required to align those components in the improved joint 10. For that reason, the hinge-reinforcement portions 26 are beneficial for decreasing the manufacturing cycle time of vehicles, as well as the costs associated therewith.

Each hinge-reinforcement portion 26 includes a mounting flange 28 and one or more strengthening flanges 30 extending therefrom.

The mounting flanges 32 are coupled to the body-side structure 14 via automatic laser welding, continuous fusion welding, bolt fasteners, rivet fasteners, various other suitable fastening processes, or any combination thereof. In this embodiment, the mounting flanges 32 are secured to an interior side 34 of the pillar member 24. Specifically, the mounting flanges 32 are spaced apart from each other by a predetermined distance and are located on the interior side 34 of the pillar member 24. In that way, the mounting flanges 32 of the hinge-reinforcement portions 26 reinforce the pillar member 24 and are positioned for supporting one or more conventional door hinges (not shown), which are disposed adjacent thereto. As a result, these hinge-reinforcement portions 26 are beneficial for minimizing door sag.

However, it is understood that the mounting flanges 32 can instead be coupled to various other components of the body-side structure 14 in a variety of suitable locations as desired.

Furthermore, in this embodiment, two strengthening flanges 30 extend substantially perpendicularly from opposing sides of each mounting flange 28. It is understood that these strengthening flanges 30 support the mounting flange 28 and strengthen the attachment between the front-end structure 12 and the body-side structure 14. However, it is understood that more or less than two strengthening flanges 30 can be utilized as desired. In addition, the strengthening flanges 30 can extend from the mounting flange 32 by various suitable angles besides substantially perpendicularly.

Also, in this embodiment, each open-ended portion 20 of the hydroformed tubes 18a, 18b has the seal apparatus 16 coupled thereto. With particular attention to FIGS. 6 and 7, the seal apparatus 16 is a one-piece injection-molded construction with a ring portion 36, a gate portion 38, and an intermediate portion 40 extending between the ring portion 36 and the gate portion 38. It is understood that the seal apparatus 16 can instead be comprised of two or more separate components and/or be manufactured by various other suitable processes as desired.

Figure 5:
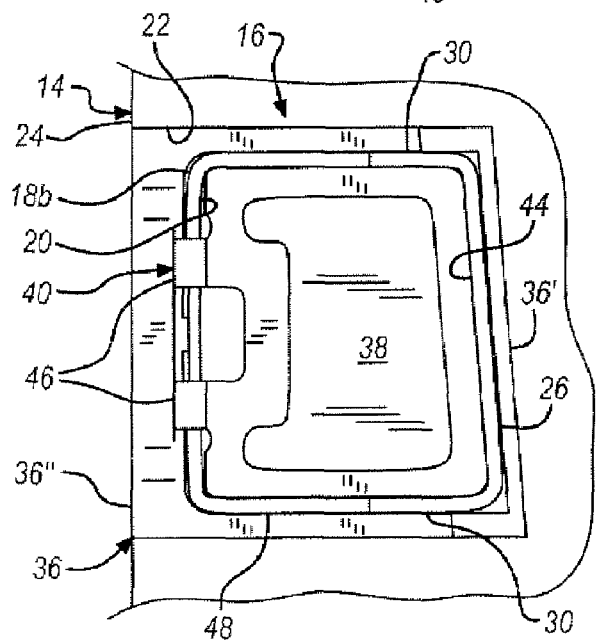
FIG. 5 is an enlarged plan view of the improved front-end to body-side joint shown in FIG. 1, as taken along perspective arrow 5, illustrating the seal apparatus sealing an open-ended tubular front-end structure and an interface between the open-ended tubular front-end structure and a body-side structure.

As best shown in FIGS. 5–7, each ring portion 36 has an outboard-ring portion 36' for sealing an interface between the pillar member 24 and the respective hydroformed tube 18a, 18b. Moreover, each ring portion 36 further includes an inboard-ring portion 36", which extends from the outboard-ring portion 36' and is utilized for sealing an interface between the respective hydroformed tube 18a, 18b and a conventional door inner (not shown).

The gate portion 38 of each seal apparatus 16 is utilized for sealing an interior cavity 42 (best shown in FIG. 2) of the respective hydroformed tubes 18a, 18b. As detailed in the description for FIG. 8, the gate portion 38 is comprised of a material having a predetermined coefficient of thermal expansion. In this way, the gate portion 38 is sized sufficiently small for being inserted into the interior cavity 42 of the respective tubes 18a, 18b. In addition, when the gate portion 38 expands and receives a predetermined amount of heat, the gate portion 38 is sized sufficiently large for sealingly coupling to an interior surface 44 of those tubes 18a, 18b. However, it is understood that the gate portion 38 can be coupled to the interior surface 44 of the tube 18a, 18b by other suitable methods.

In other words, the gate portion 38 has a first size, which is sufficiently smaller than the inner diameter of the respective tube 18a, 18b so as to offset the gate portion 38 from the interior surface 44 of those tubes 18a, 18b. This configuration is beneficial for providing unobstructed access to the interior surface 44 prior to the application of one or more corrosion-resistant chemicals and/or other treatments to the interior surface 44 of the tubes 18a, 18b. Thereafter, the gate portion 38 can be heated and expanded to a second size for sealingly coupling the gate portion 38 to the interior surface 44 of the tubes 18a, 18b.

Also in this embodiment, as best shown in FIGS. 1 and 7, the intermediate portion 40 has an elbow construction for contacting the open-ended portion 20 of each tube 18a, 18b and positioning the seal apparatus 16 in a predetermined location on the respective tube 18a, 18b. Specifically, the intermediate portion 40 includes two arm members 46 extending between the ring portion 36 and the gate portion 38. However, it is contemplated that the intermediate portion 40 can instead have more or less than two arm members 46 or a variety of other suitable constructions as desired.

Furthermore, each tube 18a, 18b has an annular groove 48 formed therein for receiving the ring portion 36 and locating the seal apparatus 16 in the predetermined location on the tubes 18a, 18b. Specifically, the ring portion 36 is sufficiently elastic for stretching and deforming around the open-ended portion 20 of the tube 18a, 18b and receiving the respective open-ended portion 20. In that way the ring portion 36 can snap-fit into the annular groove 48 and position the seal apparatus 16 in the predetermined location. It is also contemplated that the tubes 18a, 18b can instead have a protrusion, a depression, various other detent structures, or any combination thereof for positioning the seal apparatus 16 in the predetermined location.

Referring now to FIG. 8, there is shown a logic flow diagram for a method of manufacturing the improved joint 10 shown in FIG. 1. The method commences in step 100 and then immediately proceeds to step 102.

In step 102, the ring portion 36 of each seal apparatus 16 is coupled to the front-end structure 12, namely the hydroformed tubes 18a, 18b, in the predetermined location. This step preferably is accomplished by stretching each ring portion 36 over the outer diameter of the respective open-ended portion 20 of the tubes 18a, 18b and sliding the ring portion 36 across those tubes 18a, 18b into a snap-fit engagement with the respective groove 48.

In addition, this step preferably is accomplished by abutting the elbow construction of the intermediate portion 40 against the open-ended portion 20 of the respective tube 18a, 18b. In that way, the ring portion 36 and the gate portion 38 of the seal apparatus 16 are positioned for sealing the interface between the pillar member 24 and the respective tubes 18a, 18b and the interface between the tubes 18a, 18b and the door inner.

The gate portion 38 is sized for being inserted into the interior cavity 42 of the respective tube 18a, 18b and being offset from the interior surface 44 of that tube 18a, 18b. However, it is contemplated that this step can be accomplished in a variety of other suitable methods as desired. The sequence then proceeds to step 104.

In step 104, a corrosion-resistant coating is applied to the hydroformed tubes 18a, 18b. Specifically, the coating is applied substantially across the interior surface 44 of the tubes 18a, 18b without obstruction by the gate portion 38. This corrosion-resistant coating can be applied via an electroplating process, electro-polishing process, or various other suitable processes as desired. In addition, various other suitable treatments can be performed as desired. Then, the sequence proceeds to step 106.

In step 106, the hydroformed tubes 18a, 18b are coupled to the pillar member 24 via automatic laser welding, continuous fusion welding, bolt fasteners, rivet fasteners, various other suitable fastening processes, or any combination thereof. Specifically, the hydroformed tubes 18a, 18b, each have the hinge-reinforcement portion 26 with the mounting flange 28 that is coupled to the pillar member 24. However, it is contemplated that the front-end structure 12 can instead be coupled to the body-side structure 14 by way of a variety of other suitable methods as desired. The sequence then proceeds to step 108.

In step 108, the gate portion 38 is sealingly coupled to the interior surface 44 of the respective tube 18a, 18b. In this embodiment, this step is accomplished by comprising the gate portion 38 of a material having a predetermined coefficient of thermal expansion and heating the gate portion 38 to a predetermined temperature. Specifically, in steps 102 and 104, the gate portion 38 has a first size, which is sufficiently smaller than the inner diameter of the tubes 18a, 18b for offsetting the gate portion 38 from the interior surface 44. Thereafter, in step 108, heat is applied to the gate portion 38 for expanding the gate portion 38 from the first size to the second size. In that way, the gate portion 38 of the second size is sealingly coupled to the interior surface 44 of the respective tube 18a, 18b.

In this embodiment, heat is applied to the gate portion 38 when the vehicle is placed in an oven for curing paint applied to the vehicle. However, it is contemplated that this step can be accomplished by a variety of suitable methods as desired.

While particular embodiments of the invention have been shown and described, it will be understood, of course, that the invention is not limited thereto since modifications may be made by those skilled in the art, particularly in light of the foregoing teachings. Accordingly, it is intended that the invention be limited only in terms of the appended claims.

What is claimed is:

1. A seal apparatus for an improved front-end to body-side joint of a vehicle, comprising:
    a ring portion for receiving an open-ended tubular front-end structure of the improved front-end to body-side joint, said ring portion for sealing an interface between said open-ended tubular front-end structure and a body-side structure;
    a gate portion that is sized for insertion into an interior cavity of said open-ended tubular front-end structure and for blocking communication of noise through said interior cavity; and
    an intermediate portion extending between said ring portion and said gate portion;
    at least one of said ring portion and said intermediate portion has a self-locating construction for positioning the seal apparatus in a predetermined location on said open-ended tubular front-end structure.

2. The seal apparatus as recited in claim 1 wherein said gate portion has a predetermined coefficient of thermal expansion for expanding said gate portion from a first size to a second size and sealingly coupling said gate portion to an interior surface of said open-ended tubular front-end structure.

3. The seal apparatus as recited in claim 2 wherein said gate portion of said first size is offset from said interior surface of said open-ended tubular front-end structure.

4. The seal apparatus as recited in claim 1 wherein said self-locating construction is an elbow construction of said intermediate portion and positions the seal apparatus in a predetermined location on said open-ended tubular front-end structure.

5. The seal apparatus as recited in claim 1 wherein said ring portion includes an outboard-ring portion sealing said interface between said tubular open-ended front-end structure and a pillar member of said body-side structure.

6. The seal apparatus as recited in claim 1 wherein said ring portion includes an inboard-ring portion sealing said interface between said tubular open-ended front-end structure and a door inner.

7. An improved front-end to body-side joint of a vehicle, comprising:
    an open-ended tubular front-end structure;
    a body-side structure coupled to said open-ended tubular front-end structure;
    a seal apparatus sealing an interface between said open-ended tubular front-end structure and said body-side structure;
    said seal apparatus blocking communication of noise through an interior cavity of said open-ended tubular front-end structure;
    said seal apparatus including a ring portion, a gate portion, and an intermediate portion;
    said intermediate portion extending between said ring portion and said gate portion;
    said ring portion receiving said open-ended tubular front-end structure and sealing said interface between said open-ended tubular front-end structure and said body-side structure;
    said gate portion sized for insertion into said interior cavity of said open-ended tubular front-end structure and blocking communication of noise through said interior cavity;
    at least one of said ring portion and said intermediate portion has a self-locating construction positioning the seal apparatus in a predetermined location on said open-ended tubular front-end structure.

8. The improved front-end to body-side joint as recited in claim 7 wherein said open-ended tubular front-end structure comprises at least one hydroformed tube.

9. The improved front-end to body-side joint as recited in claim 8 wherein said at least one hydroformed tube has a hinge-reinforcement portion extending attached to a pillar member of said body-side structure and reinforcing said pillar member.

10. The improved front-end to body-side joint as recited in claim 9 wherein said hinge-reinforcement portion includes a mounting flange attached to said pillar member and at least one strengthening flange extending from said mounting flange.

11. The improved front-end to body-side joint as recited in claim 9 wherein said at least one hydroformed tube includes a first hydroformed tube and a second hydroformed tube coupled to said first hydroformed tube, said first hydroformed tube and said second hydroformed tube respectively having a first open-ended portion and a second open-ended portion attached to said body-side structure, said first open-ended portion and said second open-ended portion spaced apart a predetermined distance for supporting said body-side structure.

12. The improved front-end to body-side joint as recited in claim 9 wherein said at least one hinge-reinforcement portion is coupled to an interior side of said pillar member.

13. The improved front-end to body-side joint as recited in claim 8 wherein said pillar member has at least one notch with said at least one hydroformed tube therein.

14. The improved front-end to body-side joint as recited in claim 8 wherein said at least one hydroformed tube has at least one groove receiving said ring portion of said seal apparatus and locating said seal apparatus in a predetermined position.

15. The improved front-end to body-side joint as recited in claim 7 wherein said ring portion of said seal apparatus includes an outboard-ring portion and an inboard ring portion with said outboard-ring portion sealing said interface between said tubular open-ended front-end structure and a pillar member of said body-side structure and said inboard-seal portion sealing said interface between said open-ended tubular front-end structure and a door inner.

16. The improved front-end to body-side joint as recited in claim 7 wherein said self-locating construction is an elbow construction of said intermediate portion and contacts an end portion of said open-ended tubular front-end structure for positioning the seal apparatus in a predetermined location on said open-ended tubular front-end structure.

17. The improved front-end to body-side joint as recited in claim 7 wherein said gate portion has a predetermined coefficient of thermal expansion for expanding said gate portion from a first size to a second size and sealingly coupling said gate portion to an interior surface of said open-ended tubular front-end structure.

* * * * *